(12) United States Patent
Sivasiva Ganesan et al.

(10) Patent No.: US 11,190,249 B2
(45) Date of Patent: Nov. 30, 2021

(54) MU-MIMO PRECODER DESIGN AND USE FOR A WIDEBAND MMIMO SYSTEM WITH CONSTRAINED RF CHAINS IN A MULTI-PATH ENVIRONMENT

(71) Applicant: Nokia Solutions and Networks Oy, Espoo (FI)

(72) Inventors: Rakash Sivasiva Ganesan, Unterhaching (DE); Wolfgang Zirwas, Munich (DE); Berthold Panzner, Holzkirchen (DE)

(73) Assignee: Nokia Solutions and Networks Oy, Espoo (FI)

( * ) Notice: Subject to any disclaimer, the term of this patent is extended or adjusted under 35 U.S.C. 154(b) by 38 days.

(21) Appl. No.: 16/617,684

(22) PCT Filed: Jun. 14, 2017

(86) PCT No.: PCT/EP2017/064563
§ 371 (c)(1),
(2) Date: Nov. 27, 2019

(87) PCT Pub. No.: WO2018/228685
PCT Pub. Date: Dec. 20, 2018

(65) Prior Publication Data
US 2020/0091979 A1 Mar. 19, 2020

(51) Int. Cl.
*H04B 7/06* (2006.01)
*H04B 7/0452* (2017.01)
(Continued)

(52) U.S. Cl.
CPC ......... *H04B 7/0617* (2013.01); *H04B 7/0452* (2013.01); *H04B 7/0456* (2013.01);
(Continued)

(58) Field of Classification Search
CPC .. H04B 7/0617; H04B 7/0452; H04B 7/0456; H04B 7/0626; H04L 5/0023; H04L 5/0048
See application file for complete search history.

(56) References Cited

U.S. PATENT DOCUMENTS 9,231,676 B2   1/2016  Zirwas et al. ................ 375/259
2015/0327119 A1  11/2015  Ko et al.
(Continued)

FOREIGN PATENT DOCUMENTS

CN   102340377 A   2/2012
CN   105745893 A   7/2016

OTHER PUBLICATIONS

Guerreiro et al. "Use of 1-bit digital-to-analog converters in massive MIMO systems", Electronics Letters, Feb. 2016 (Year: 2016).*
(Continued)

*Primary Examiner* — Sophia Vlahos
(74) *Attorney, Agent, or Firm* — Harrington & Smith

(57) ABSTRACT

For a system with multiple Antenna Elements, AEs, to be used to transmit multiple symbols to multiple user equipments, UEs, and with multiple time sample positions, where the symbols occupy a time-frequency resource space and wherein at least some of the AEs are powered by constrained RF chains having functionalities that are simplified relative to full RF chains, precoder coefficients are generated for the multiple AEs taking into consideration multipath components of a signal to be transmitted from the multiple AEs to the multiple UEs. The generating forms precoder coefficients for individual ones of the constrained RF chains at corresponding certain time sample positions of the symbols. The signal is transmitted from the multiple AEs to the multiple UEs using FDMA at least by applying the generated precoder coefficients to the multiple AEs over the
(Continued)

multiple time sample positions and time-frequency resource space of the symbols.

17 Claims, 10 Drawing Sheets

(51) Int. Cl.
  *H04B 7/0456*  (2017.01)
  *H04L 5/00*  (2006.01)
(52) U.S. Cl.
  CPC ......... *H04B 7/0626* (2013.01); *H04L 5/0023* (2013.01); *H04L 5/0048* (2013.01)

(56) References Cited

U.S. PATENT DOCUMENTS

2016/0080129 A1  3/2016  Jang et al.
2019/0097704 A1*  3/2019  Faronius .............. H04B 7/0421

OTHER PUBLICATIONS

Jacobsson et al. "Nonlinear 1-Bit Precoding for Massive MU-MIMO with Higher-Order Modulation", Mar. 6, 2017, IEEE, pp. 763-767. (Year: 2017).*

Lin et al. "Energy Efficient Hybrid Precoding for Multi-User Massive MIMO Systems Using Low-Resolution ADCs", Dec. 12, 2016, IEEE, pp. 115-120. (Year: 2016).*

Saxena et al. "On One-Bit Quantized ZF Precoding for the Multiuser Massive MIMO Downlink", Mar. 6, 2017, IEEE pp. 758-762. (Year: 2017).*

Jedda et al. "Spatial Coding Based on Minimum BER in 1-Bit Massive MIMO Systems", Mar. 6, 2017, IEEE, pp. 753-757. (Year: 2017).*

Castaneda et al. "1-bit Massive MU-MIMO precoding in VLSI", Feb. 11, 2017, arXiv, pp. 1-13. (Year: 2017).*

Guerreiro, J., et al., "Use of 1-bit digital-to-analogue converters in massive MIMO systems", Apr. 28, 2016, Electronics Let., IEEE Stevenage, GB, 1 pg., abstract only.

Saxena, A.K., et al., "Analysis of One-Bit Quantized Precoding for the Multiuser Massive MIMO Downlink", Oct. 20, 2016, arxiv.org, 10 pgs.

Usman, O.B., et al., "MMSE Precoder for Massive MIMO Using 1-Bit Quantization", Mar. 20, 2016, 2016 IEEE International Conference on Acoustics, Speech and Signal Processing (ICASSP), IEEE, 5 pgs.

Jacobsson, S., et al., "Massive MU-MIMO-OFDM Downlink with One-Bit DACs and Linear Precoding", Apr. 15, 2017, arxiv.org, Cornell University Library, Ithaca, New York, 6 pgs.

* cited by examiner

MU-MIMO PRECODER DESIGN AND USE FOR A WIDEBAND MMIMO SYSTEM WITH CONSTRAINED RF CHAINS IN A MULTI-PATH ENVIRONMENT

CROSS REFERENCE TO RELATED APPLICATION

This patent application is a U.S. National Stage application of International Patent Application Number PCT/EP2017/064563 filed Jun. 14, 2017, which is hereby incorporated by reference in its entirety.

TECHNICAL FIELD

This invention relates generally to wireless communication and, more specifically, relates to communications using massive Multiple In Multiple Out (mMIMO) antenna systems.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Low cost implementation of massive MIMO (mMIMO) antenna arrays with potentially hundreds or more antenna elements has been proposed, where there are many low effort RF chains having very limited capabilities. For instance, these RF chains may have restricted DACs with only single bit quantization and/or limited Tx power. In the simplest case, the DACs have only one-bit resolution, i.e., the antenna elements can either be switched on or switched off. An over-the-air signal generation mechanism may be used to construct the desired signal (in the time domain) at the receiver. See, e.g., Wolfgang Zirwas and Berthold Panzner, "Low effort massive MIMO antenna arrays and their use", U.S. Pat. No. 9,231,676.

BRIEF SUMMARY

This section is intended to include examples and is not intended to be limiting.

A method is disclosed in an exemplary embodiment. The method comprises, for a system with multiple antenna elements to be used to transmit multiple symbols to multiple user equipment and with multiple time sample positions, where the symbols occupy a time-frequency resource space and wherein at least some of the antenna elements are powered by constrained radio frequency (RF) chains having functionalities that are simplified relative to full RF chains, generating precoder coefficients for the multiple antenna elements taking into consideration multipath components of a signal to be transmitted from the multiple antenna elements to the multiple user equipment. The generating forms precoder coefficients for individual ones of the constrained RF chains at corresponding certain time sample positions of the symbols. The method also comprises transmitting the signal from the multiple antenna elements to the multiple user equipment using frequency division multiple access at least by applying the generated precoder coefficients to the multiple antenna elements over the multiple time sample positions and time-frequency resource space of the symbols.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: for a system with multiple antenna elements to be used to transmit multiple symbols to multiple user equipment and with multiple time sample positions, where the symbols occupy a time-frequency resource space and wherein at least some of the antenna elements are powered by constrained radio frequency (RF) chains having functionalities that are simplified relative to full RF chains, generating precoder coefficients for the multiple antenna elements taking into consideration multipath components of a signal to be transmitted from the multiple antenna elements to the multiple user equipment, wherein the generating forms precoder coefficients for individual ones of the constrained RF chains at corresponding certain time sample positions of the symbols; and transmitting the signal from the multiple antenna elements to the multiple user equipment using frequency division multiple access at least by applying the generated precoder coefficients to the multiple antenna elements over the multiple time sample positions and time-frequency resource space of the symbols.

In another exemplary embodiment, an apparatus comprises: means, for a system with multiple antenna elements to be used to transmit multiple symbols to multiple user equipment and with multiple time sample positions, where the symbols occupy a time-frequency resource space and wherein at least some of the antenna elements are powered by constrained radio frequency (RF) chains having functionalities that are simplified relative to full RF chains, for generating precoder coefficients for the multiple antenna elements taking into consideration multipath components of a signal to be transmitted from the multiple antenna elements to the multiple user equipment, wherein the generating forms precoder coefficients for individual ones of the constrained RF chains at corresponding certain time sample positions of the symbols; and means for transmitting the signal from the multiple antenna elements to the multiple user equipment using frequency division multiple access at least by applying the generated precoder coefficients to the multiple antenna elements over the multiple time sample positions and time-frequency resource space of the symbols.

An example of a computer program product includes a computer-readable storage medium bearing computer program code embodied therein for use with a computer. The computer program code includes: code for, for a system with multiple antenna elements to be used to transmit multiple symbols to multiple user equipment and with multiple time sample positions, where the symbols occupy a time-frequency resource space and wherein at least some of the antenna elements are powered by constrained radio frequency (RF) chains having functionalities that are simplified relative to full RF chains, generating precoder coefficients for the multiple antenna elements taking into consideration multipath components of a signal to be transmitted from the multiple antenna elements to the multiple user equipment, wherein the generating forms precoder coefficients for individual ones of the constrained RF chains at corresponding certain time sample positions of the symbols; and code for transmitting the signal from the multiple antenna elements to the multiple user equipment using frequency division multiple access at least by applying the generated precoder coefficients to the multiple antenna elements over the multiple time sample positions and time-frequency resource space of the symbols.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for MU-MIMO precoder design for a wideband mMIMO system with constrained RF chains in a multi-path environment. Additional description of these techniques is presented after a system into which the exemplary embodiments may be used is described.

Figure 1:
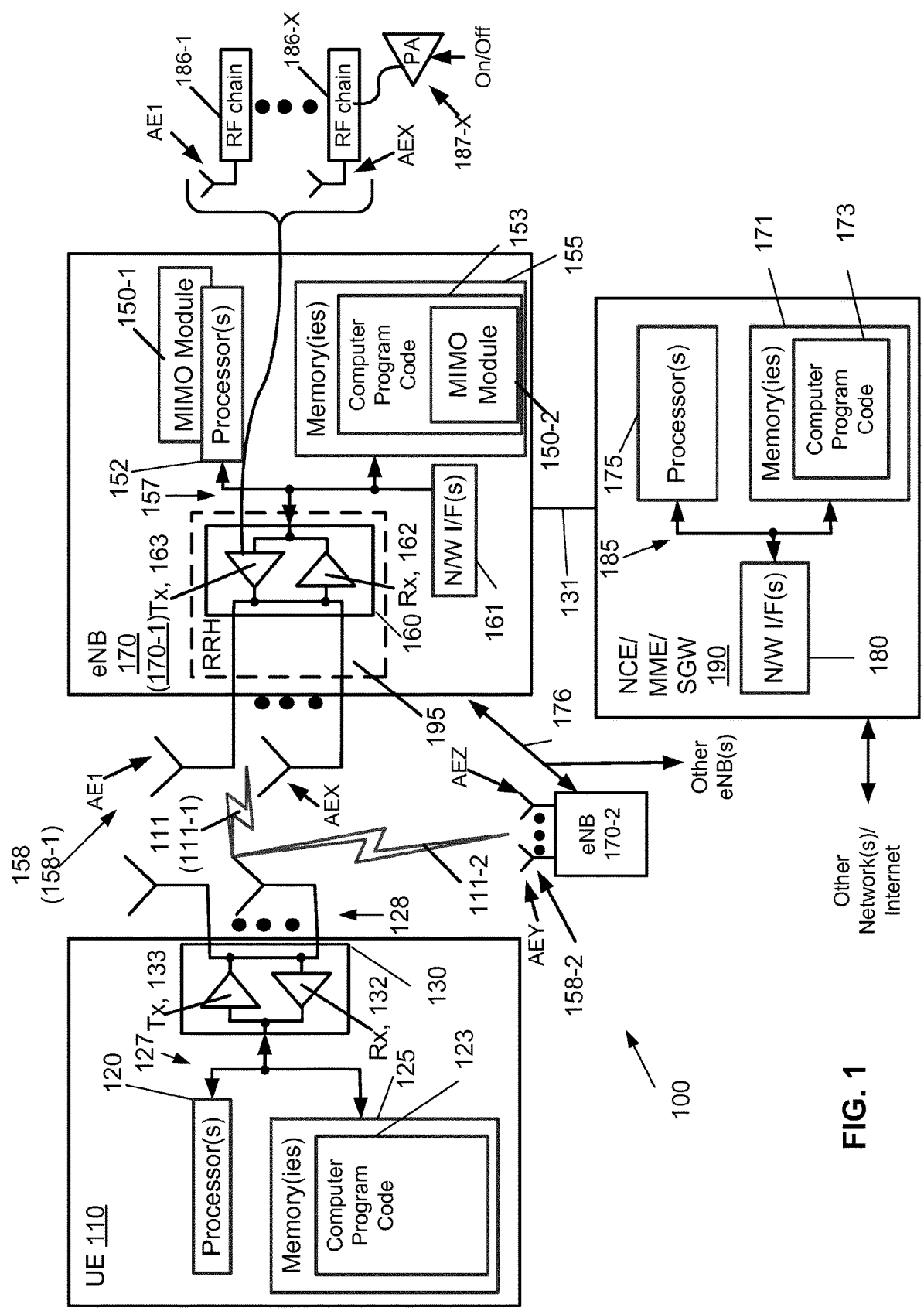
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. Note that the term "eNB" is typically used for 4G, while the term "gNB" is used for 5G. For ease of reference, it is assumed herein that the base station 170 is an eNB, but the base station 170 could be a gNB or other base stations for different radio access technologies. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. In this example, there are X antenna elements (AEs), AE1 through AEX. In general, there is one of either a full or a constrained RF chain 186 per AE. Each RF chain 186 powers a corresponding AE, e.g., based on a precoder coefficient. There are 186-1 through 186-X RF chains in this example. A constrained RF might not be really an RF "chain", but instead just an on/off switching of power amplifiers feeding an antenna element. This is illustrated by the power amplifier (PA) 187-X for RF chain 186-X with an input that can turn the PA 187-X on or off ("On/Off"). More particularly, the RF chains 186 may be full RF chains, which are conventional RFs with up- and down-conversion of baseband signals, a signal power amplifier with linearization circuit, ADC and DAC, RF filter, and the like. A constrained RF chain is simplified in one or more or the above described functionalities, such as using ADC converters with a lower number of bits for quantization, like using only one single bit, on/off only of power amplifiers, no linearization circuit, relaxed RF filters, and the like. The instant examples are therefore not limited to on/off functionality for the constrained RF chains 186. In case of, e.g., three bits DACs, the precoder coefficients are three bits of signal.

The one or more memories 155 include computer program code 153. The eNB 170 includes a MIMO module 150, comprising one of or both parts 150-1 and/or 150-2, which may be implemented in a number of ways. The MIMO module 150 may be implemented in hardware as MIMO module 150-1, such as being implemented as part of the one or more processors 152. The MIMO module 150-1 may be implemented also as an integrated circuit or through other hardware such as a programmable gate array. In another example, the MIMO module 150 may be implemented as MIMO module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

In one example, the antennas 158 are at a single location (co-located) and one eNB 170 is primarily used. The antennas 158 have N AEs, shown as AE1 to AEX, where X=N. However, a second eNB 170-2 may also be used, e.g., a location separated by a distance from the first eNB 170-1. In this case, the UE 110 receives a link 111-1 from the eNB 170-1 and a link 111-2 from the eNB 170-2, and an entire antenna array 158 includes the antennas 158-1 from the eNB 170-1 and antennas 158-2 from the eNB 170-2. The N AEs are split between X AEs for eNB 170-1 and Z-Y AEs (from AEY to AEZ) for eNB 170-2.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

Having thus introduced one suitable but non-limiting technical context for the practice of the exemplary embodiments of this invention, the exemplary embodiments will now be described with greater specificity.

Certain mMIMO systems use a technique where specific antenna elements are simultaneously switched on such that the combination of their corresponding channel coefficients result in the required signal at the receiver, or in case of MU MIMO, at the multiple receivers. This type of transmission mechanism faces two challenges as follows.

A first challenge is that, in a multi-path environment, there is strong inter-symbol interference. One approach to address inter-symbol interference with high end RF chains (conventional RF chains with full capability) is to use a multi-carrier system like OFDM together with a guard interval of sufficient length. In case of mMIMO systems with constrained RF chains, the over-the-air generation of the time-domain OFDM signal—consisting of, e.g., 2048 time samples in case of LTE—has to be performed sample-by-sample by switching on and off different elements of the constrained RF antenna panel. In case only the first tap of the radio channel is considered, then a straight forward approach is possible, where the antenna elements are just switched on and off so that the MSE for all UEs is minimized sample-wise. In reality, e.g., in an urban macro channel, there will be multiple reflections with multiple delays leading to inter-sample interference. This is mainly the same effect as for conventional OFDM systems using full RF chains. The difference is now that for over-the-air signal generation and for each time sample, a different set of antenna elements have to be activated and therefore the multipath channels of the active antenna elements will vary for each sample. For that reason, applying a guard interval is not sufficient and will leave significant inter-sample interference.

In M. Staudacher, et al., "Constructing Receiver Signal Points using Constrained Massive MIMO Arrays:, arXiv: 1702.02414, the Knapsack algorithm provides a good solution to serve multiple users simultaneously with low error, provided the number of constrained RFs is sufficiently high. But, this concept has been limited so far to full bandwidth scheduling per UE. This is a serious limitation compared to current LTE systems, where frequency-dependent scheduling is one of the main ingredients to higher performance. In principle, the Knapsack-like optimization of on-off switching of antenna elements can be extended also to frequency-dependent scheduling, but it significantly increases the number of side constraints for the Knapsack algorithm. For example, assuming 10 UEs per subband and 10 subbands, then the number of constraints rises from 10 to 100, which has to be paid either by a significant performance loss (worse MSE) or by a much higher number of constrained RF frontends. For a competitive solution—e.g., compared to more conventional hybrid analog-digital massive MIMO concepts—an efficient frequency dependent scheduling has to be supported.

For example, in a conventional system with high resolution ADCs, where different users are scheduled in different frequencies/subcarriers, the orthogonality is guaranteed by the underlying FDMA process. However, with constrained RF chains for over-the-air signal generation mechanism, the precoder needs to make sure that the signal resulting at different receivers are orthogonal to each other at least in the desired band of each receiver.

Precoder design for MIMO systems with constrained RF chains for narrow band channel where single tap equalization is sufficient have been addressed. All these perform over-the-air signal generation to construct the desired symbol for e.g. QAM symbols at the receiver. The basic idea is as follows. When an antenna element is switched on (e.g., transmit 1), the signal received at the receiver corresponds to the channel coefficient between this antenna element and the receiver antenna. In an over-the-air signal generation mechanism, a subset of all the antenna elements is switched on such that the sum of their channel coefficients results in the desired symbol at the receiver. Different schemes have been proposed to identify the combinations of antennas that need to be activated in order construct the desired signal at the receiver. In Oscar Castarieda, et al., "1-bit Massive MU-MIMO Precoding in VLSI", arXiv:1702.03449, two low complexity schemes and corresponding VLSI implementation with high throughput in hardware efficacy were proposed. In R. S. Ganesan, W. Zirwas, B. Panzner, M. Staudacher "Precoder Design for Combining High-End RF with Constrained RF of Massive MIMO Antennas", U.S. patent application Ser. No. 15/355,421, filed on Nov. 18, 2016, in addition to constrained RF chains, a few high end RF chains are also considered. An algorithm to jointly design the precoders of the constrained RF chains and the high end RF chains was also proposed.

In all the above, a single tap channel equalization is assumed, i.e., a frequency-flat, narrow-band channel is assumed. For a wideband channel typically with multiple paths, the channel is frequency selective and there are multiple taps in the channel impulse response.

Furthermore, in order to exploit the multi-user diversity in the frequency selective channel, it is desirable to have frequency division multiple access (FDMA) among the users. The over-the-air signal generation methods previously described are performed in the time domain per time sample (in LTE numerology, sample duration is 32 ns for 20 MHz bandwidth). Straight forward extension of the over-the-air signal generation mechanism for FDMA results in unnecessary additional constraints to guarantee orthogonality between the FDMA users.

The inventors are unaware of any solutions to address the multi-path nature of the channel and guarantee orthogonality of FDMA users in the over-the-air signal generation process without introducing additional constraints in the system.

Possible target scenarios for the examples herein are 5G or 4G evolution mobile communication systems. The focus herein is on the precoder design for wideband massive MIMO systems with constrained RFs in a multi-path environment, with multiple users sharing the bandwidth. The constraints could be for, e.g., DACs with limited bit resolution, cheap amplifiers with small operating region, relaxed analog filters, and the like.

One element described herein is design (centralized or distributed) of the precoder coefficients of the constrained RF chains in order to handle the following effectively: the multipath nature of the wideband channel; and the need for frequency division multiple access (FDMA). One idea is to take care of the multipath components while generating over-the-air signal generation at the receivers. Furthermore, in case of multiple users sharing the available bandwidth, it is taken into consideration that the users are interested only in their band of interest and each user therefore suppress any signal outside a desired band.

Exemplary embodiments herein solve some or all of the problems described above using at least three variants. In a first variant, a precoder is designed such that the over-air-signal generates a desired signal spectrum at each of the receivers. In addition, in a second variant, time domain solutions are provided. Finally, a combined version is disclosed where the problem is first formulated in frequency domain and then transformed to the time domain and solved.

The time as well as the frequency domain solutions for frequency dependent scheduling rely on the observation that the signal of interest of each user (i.e., UE 110) scheduled into a certain frequency subband is bandlimited, while the generated signal outside of this frequency subband may have any signal shape. The reason is that the FFT at the OFDM receiver (e.g., receiver 132 of UE 110) will filter out exactly the intended frequency subband and suppresses any signal outside the desired bandwidth. This suppression of signals outside the desired bandwidth is use in certain exemplary embodiments, as described below.

For ease of reference, the following portion of this disclosure is broken into sections.

1) Frequency Domain Example

One basic idea of this first example is to consider the over-the-air signal generation process in the frequency domain as follows. For simplicity, assume 1 (one) bit DACs, i.e., ON/OFF antenna elements (AEs). Assume OFDM as the underlying technology, where symbols occupy a time-frequency resource space, e.g., occupying some total time period and some total bandwidth. For instance, in LTE, downlink transmissions are performed using resource blocks typically occupying a time-frequency resource space having seven OFDM symbols in time (e.g., 0.5 ms) and 12 subcarriers in frequency. The techniques here are not limited to LTE, but LTE is illustrated as one particular example.

Figure 2A:
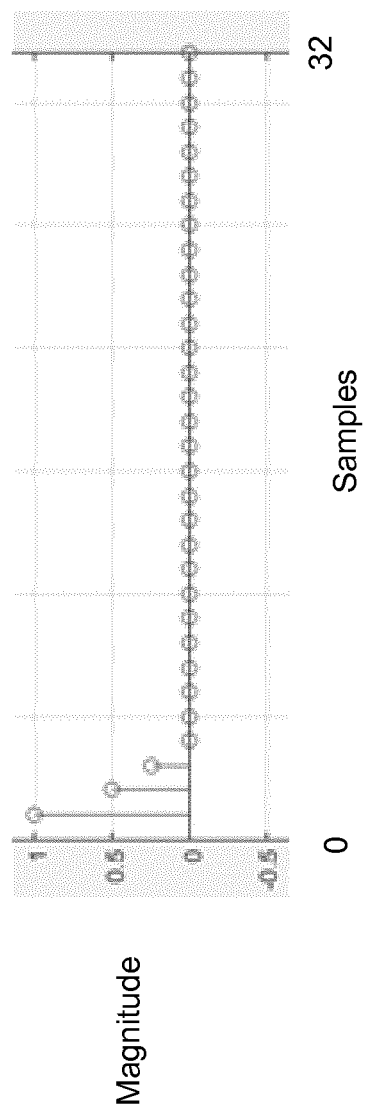
FIG. 2A illustrates an impulse response of AE1 switched on at 1st sample of OFDM symbol.
Figure 2B:
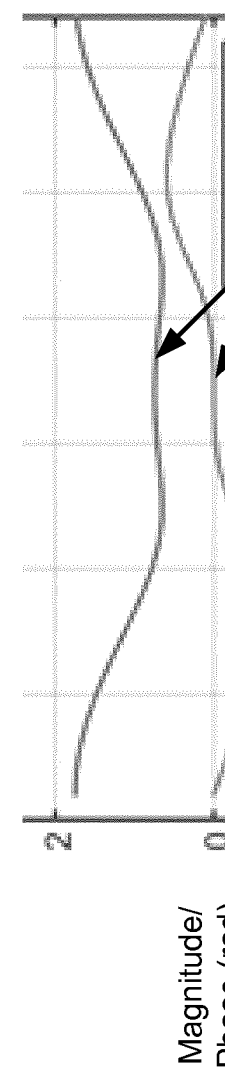
FIG. 2B illustrates amplitude and phase frequency response of AE1 switched on at first sample of OFDM symbol.
Figure 3A:
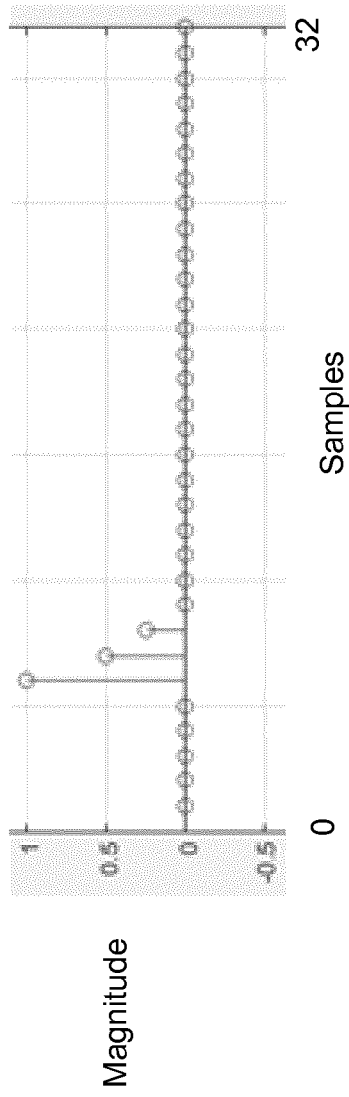
FIG. 3A illustrates an impulse response of AE1 switched on at 6th sample of OFDM symbol.
Figure 3B:
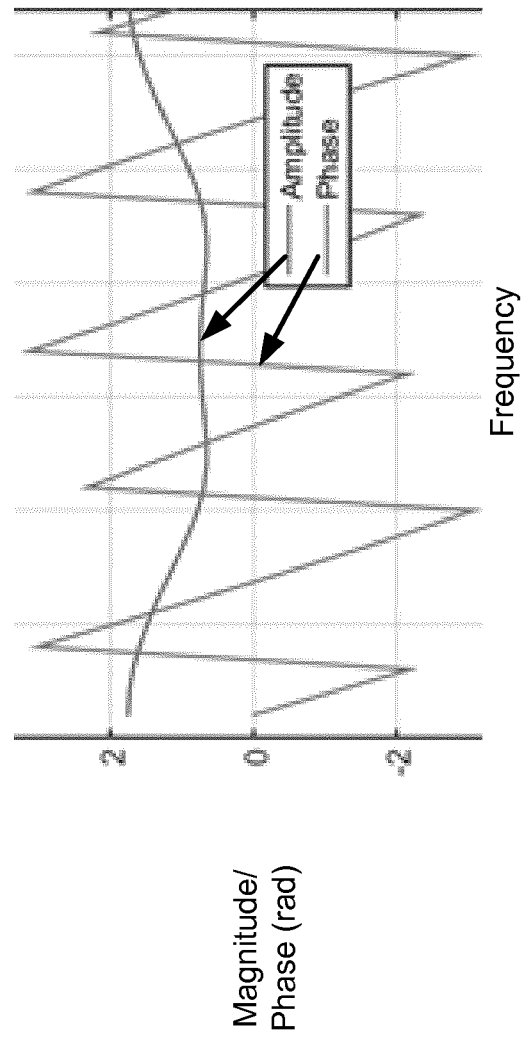
FIG. 3B illustrates amplitude and phase frequency response of AE1 switched on at 6th sample of OFDM symbol.
Figure 4A:
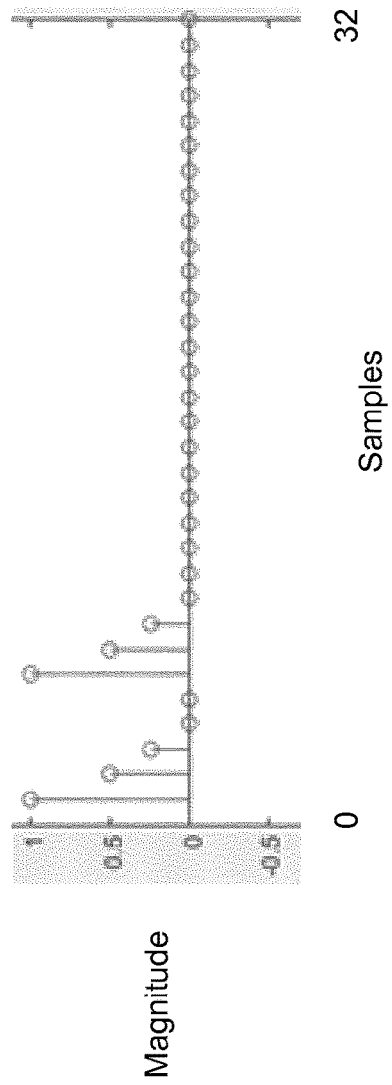
FIG. 4A illustrates a signal generated at receiver by switching on AE1 at the first and sixth samples of the OFDM symbol.
Figure 4B:
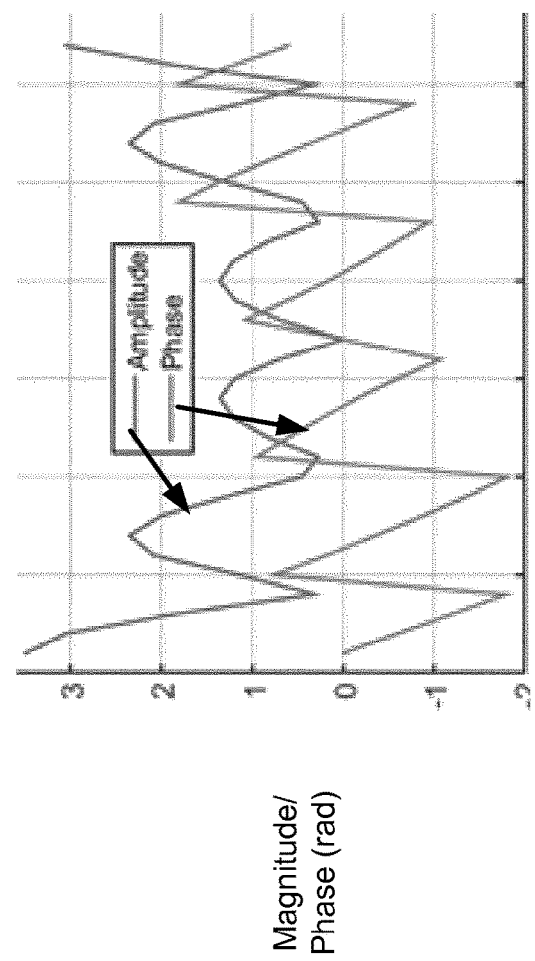
FIG. 4B illustrates a "toy" example of DCTF which is obtained by switching on AE1 at the first and sixth samples of the OFDM symbol (as illustrated by FIG. 3A)

First consider a single AE. Switching on this antenna element results in a channel impulse response observed at a receiver. FIG. 2A shows an example where AE1 is switched on at the first sample of the OFDM symbol. The corresponding channel transfer function (CTF) is shown in FIG. 2B. This AE can be switched on at any sample instant of the OFDM symbol. If the AE is switched on at 6th sample as shown in FIG. 3A, then it results in a CTF shown in FIG. 3B which is a phase term multiplied version of the CTF shown in FIG. 3A. Since the AE can be switched on at one of the Q sample positions of the OFDM symbol, there are Q CTFs corresponding to this AE. In general, if there are N AEs at the transmitter, then this results in NQ CTFs. In LTE numerology for a system with 64 Tx antennas and 20 MHz bandwidth, there are 64×2048 CTFs (where 2048 is the FFT length for LTE signals and accordingly the number of time domain samples of the Tx-signal). A candidate algorithm would find the appropriate combination of the CTFs which results in the desired CTF (DCTF) at the receivers. FIGS. 4A and 4B illustrate a "toy" example where the DCTF is obtained by switching the AE1 at sample instants one and six. The "toy" terminology means the example is not complex.

Figure 5B:
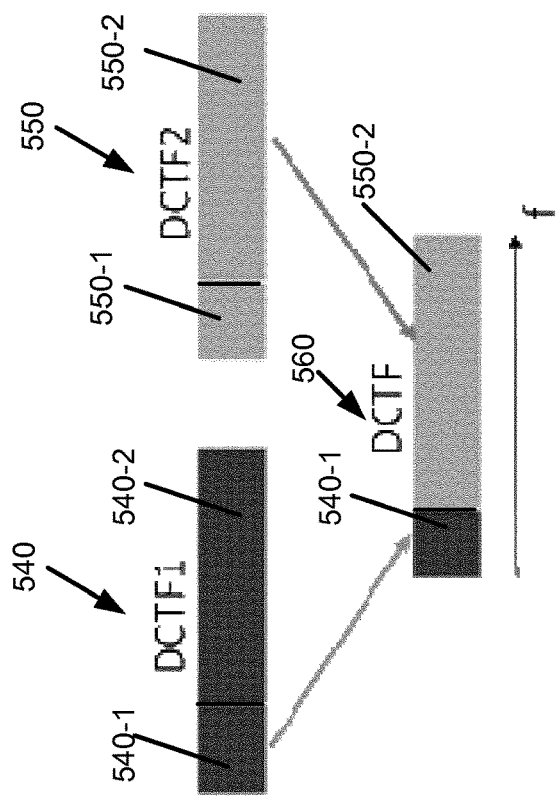
FIG. 5B is an illustration of formation of one DCTF from the DCTFs of different UEs.
Figure 5A:
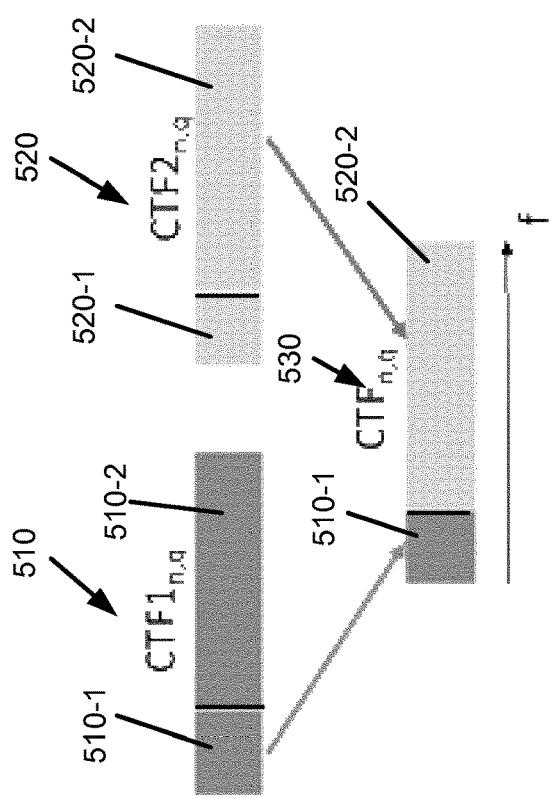
FIG. 5A is an illustration of combining CTFs of different UEs in single CTF.

In the previous paragraph, it has been shown how over-the-air signal generation can be performed in the frequency domain in a multi-path wideband channel. Next, it is shown how to support and perform FDMA in such an mMIMO system with constrained RF chains. Consider two UEs 110 for simplicity. Assume that the first quarter of the bandwidth is allocated to the first UE 110-1 and the remaining bandwidth is allocated to the second UE 110-2. In this case, each UE sees its own CTF say CTF1 510 and CTF2 520 corresponding to UEs 1 and 2, respectively. See FIG. 5A. Note that the CTFs are indicated as being $CTF1_{n,q}$ and $CTF2_{n,q}$, where the n indicates the antenna index (out of N total antennas) and q indicates sample index (out of total Q samples). Each UE 110 has its own desired CTF namely, DCTF1 540 and DCTF2 550. See FIG. 5B. Since each UE is interested only in its desired subband, the remaining part of the bandwidth can contain any arbitrary information. For instance, CTF1 510 for UE 1 has portions 510-1 and 510-2, but the UE 1 is only interested in portion 510-1. CTF2 520 for UE 2 has portions 520-1 and 520-2, but the UE 2 is only interested in portion 520-2. The DCTF is also similar, as although the DCTF1 has both portions 540-1 and 540-2, the UE 1 is only interested in DCTF1 540-1; and although the DCTF2 has both portions 550-1 and 550-2, the UE 2 is only interested in DCTF2 550-2. Therefore, a combined CTF 530 and DCTF 560 are constructed as shown in FIG. 5A and FIG. 5B respectively. The CTF 530 includes portion 510-1 from CTF1 510 and portion 520-2 from CTF2 520. The DCTF 560 includes portion 540-1 from DCTF1 540 and portion 550-2 from DCTF2 550. After this combination, we have a same NQ number of CTFs 530 and a single DCTF 560 as in the case with a single UE occupying the entire bandwidth. That is, in FIG. 5A, the $CTF_{n,q}$ is constructed from $CTF1_{n,q}$ and $CTF2_{n,q}$. Then only the $CTF_{n,q}$ from FIG. 5A is used to construct the DCTF 560 in FIG. 5B. In one example, there are 64×2048 $CTF_{n,q}$, which have the useful spectrum of both the UEs 1 and 2 put together. As described also in more detail below, an algorithm like Knapsack may be used to form the correct combination of NQ CTFs which will result in DCTF.

As additional clarification, $CTF_{n,q}$ represents that antenna n is switched on at sample q. This will create $CTF1_{n,q}$ at UE1 and $CTF2_{n,q}$ at UE2. Each UE will filter the signal and obtain only the part of the spectrum the UE is interested in. Also, DCTF1 540 is the spectrum that UE1 would like to see at the receiver. Say that UE1 uses 25% of the spectrum. For 20 MHz bandwidth, this means UE1 gets 300 subcarriers of all the 1200 subcarriers. UE1 should receive the data symbols on these 300 subcarriers, e.g., 300 QAM symbols. These 300 data symbols form the 25% of the DCTF1 and the remaining 75% of the DCTF1 can be anything (from UE1's perspective).

Figure 6:
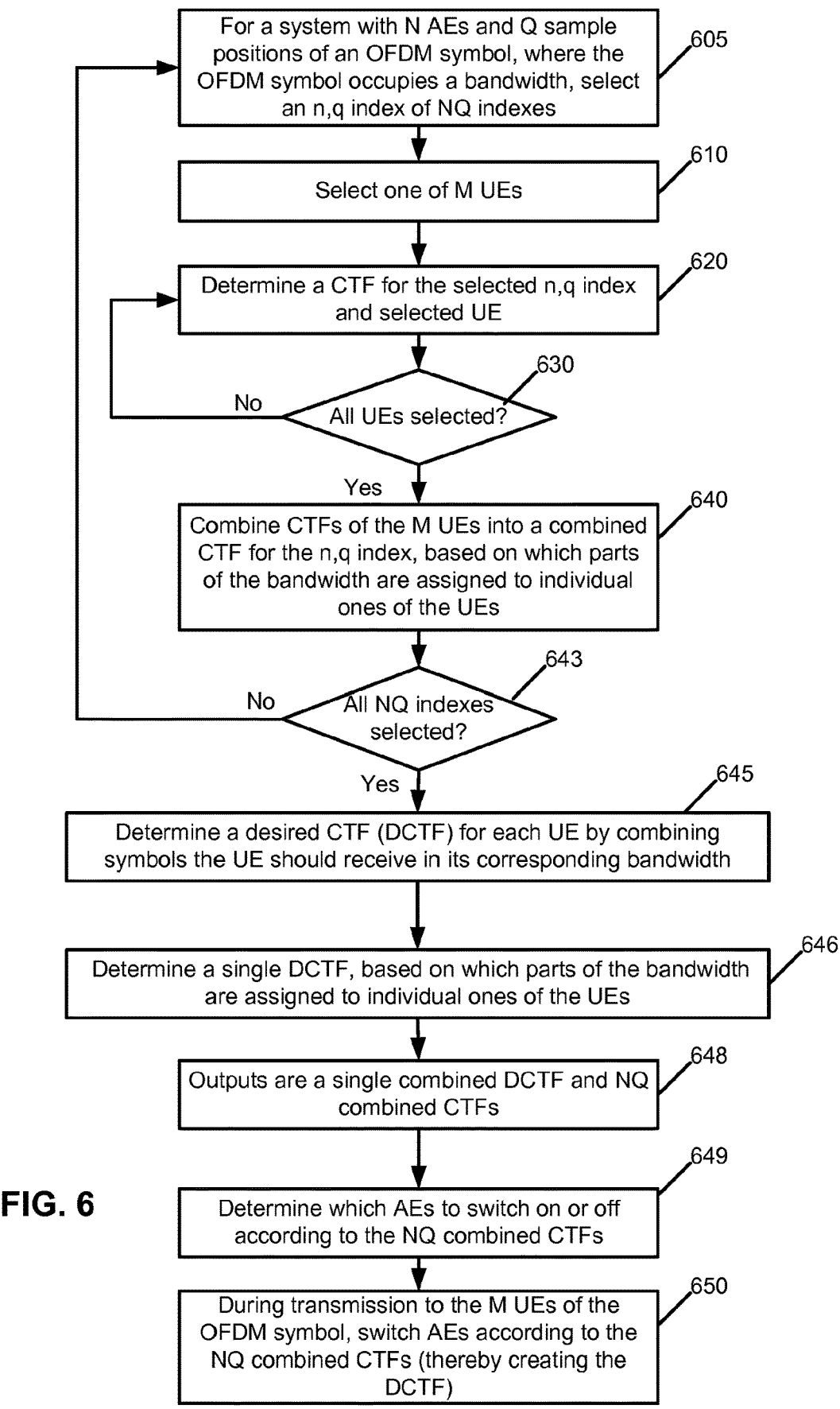
FIG. 6 is a logic flow diagram for MU-MIMO precoder design and use, using a frequency-domain technique, for a wideband mMIMO system with constrained RF chains in a multi-path environment, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 6, this figure is a logic flow diagram for MU-MIMO precoder design and use, using a frequency-domain technique, for a wideband mMIMO system with constrained RF chains in a multi-path environment. This figure also illustrates the operation of an exemplary method or methods, a result of execution of computer program instructions embodied on a computer readable memory, functions performed by logic implemented in hardware, and/or interconnected means for performing functions in accordance with exemplary embodiments. It is assumed that the blocks in FIG. 6 are performed by the eNB 170, e.g., under control of the MIMO module 150 at least in part.

In block 605, for a system with N AEs and Q sample positions of an OFDM symbol, where the OFDM symbol occupies a bandwidth, the eNB 170 selects an n,q index of NQ indexes. In block 610, the eNB 110 selects one of M UEs 110-1 through 110-M. The eNB 170 then determines in block 620 a CTF for the n,q index and the selected UE 110. In block 630, it is determined if all UEs 110 have been selected. If not (block 630=No), the flow proceeds to block 620.

If all UEs have been selected (block 630=Yes), the flow proceeds to block 640, where the eNB 170 combines CTFs of the M UEs into a combined CTF 530 for the n,q index, based on which parts of the bandwidth are assigned to individual ones of the UEs. In block 643, the eNB 170 determines whether all NQ indexes have been selected. If not (block 643=No), the flow proceeds to block 605, where another n,q index is selected from the NQ indexes. If all NQ indexes have been selected block 643=Yes), then in block 645, the eNB 170 determines a desired CTF (DCTF) for each UE by combining symbols the UE should receive in its corresponding bandwidth. This is illustrated by the DCTF1 540 and the DCTF2 550 of FIG. 5B. In block 646, the eNB 170 determines a single (e.g., combined) DCTF, based on which parts of the bandwidth are assigned to individual ones of the UEs. This is illustrated by the single DCTF 560 of FIG. 5B. The outputs are a single combined DCTF and NQ combined CTFs (block 648). In block 649, the eNB 170 determines which AEs to switch on or off according to the NQ combined CTFs such that the sum of the combined CTFs of the selected AEs results in a signal equal to/closer to (based on some criterion or criteria) the DCTF. In particular, a few of the NQ CTFs may be chosen such that their combination results in (closer to) the DCTF. In block 650, the eNB 170, during transmission to the M UEs of the OFDM symbol, switches AEs according to the NQ combined CTFs (thereby creating the DCTF).

2) Time Domain Example

The above proposed frequency domain technique supports simultaneous over-the-air generation for multipath channels as well as allows for frequency domain scheduling, but leads to a relatively large optimization problem, for example, in case of an OFDM symbol with 2048 time samples. Alternatively, multipath channels and frequency domain scheduling can be supported by suitable time-domain approaches, as described now.

For the multipath channel issue, for instance, it is proposed that the time samples are generated based on the knowledge of all the channel taps per antenna element. Then the design of the current sample depends on all the previous samples of length equal to the length of channel impulse response minus one. For that purpose, the previous time samples are stored together with the generated multipath reflections for the given subsets of activated antennas. Instead of generating directly the intended time sample signal, one subtracts first the multipath signals at the current time sample and generates only the delta signal. That way, it might be even possible to avoid any guard interval at all and save the associated overhead.

The multipath reflections can be derived from the known channel impulse responses per antenna element, for example known from UL sounding measurements. Note these CSI measurements are needed anyway for the over-the-air signal generation. The benefit of this technique is that it is straightforward and simple to implement at the cost of some extra memory.

Figure 7:
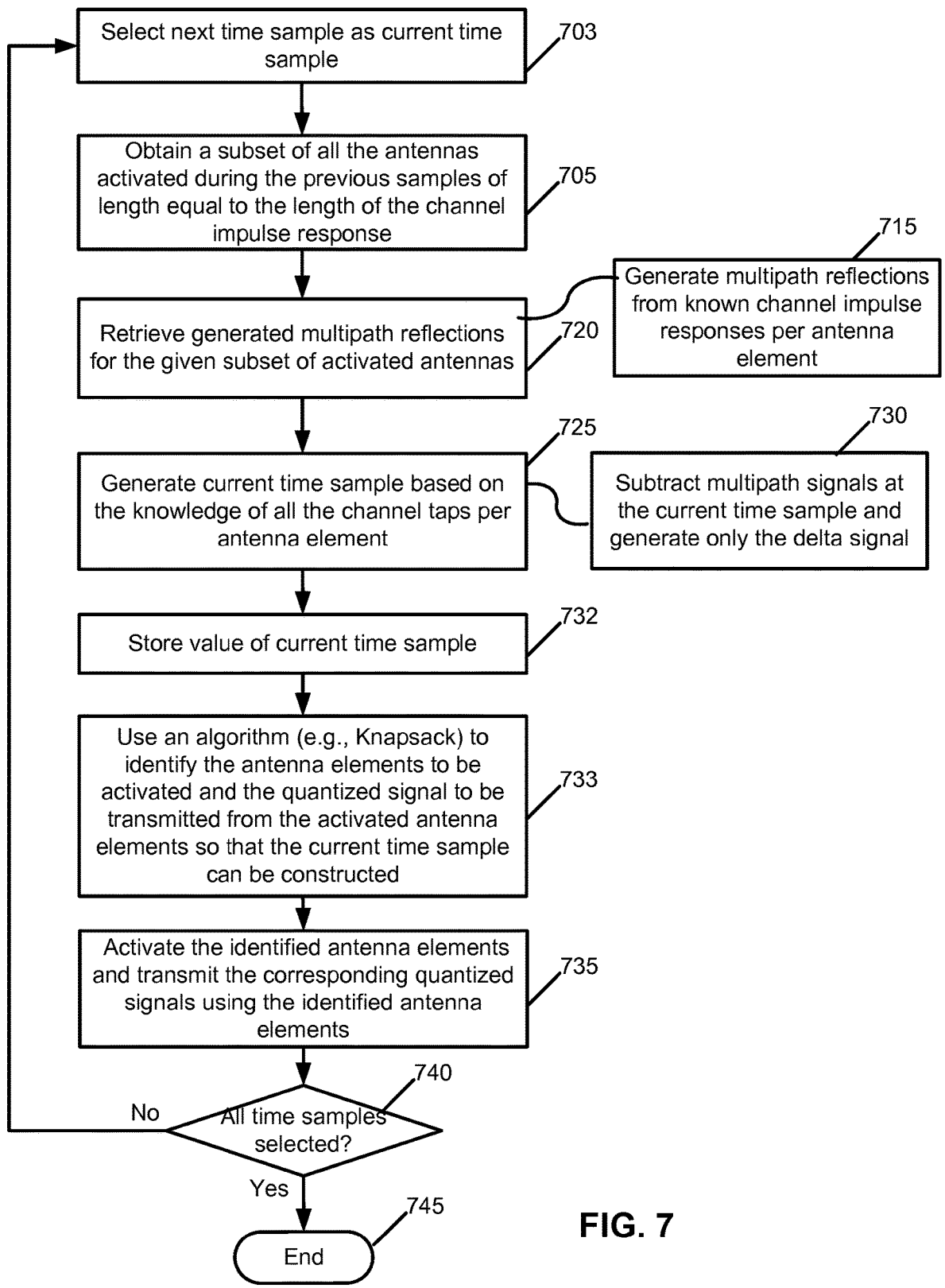
FIG. 7 is a logic flow diagram for MU-MIMO precoder design and use, using a time-domain technique, for a wideband mMIMO system with constrained RF chains in a multi-path environment, and illustrates the operation of an exemplary method or methods, a result of execution of computer program instructions embodied on a computer readable memory, functions performed by logic implemented in hardware, and/or interconnected means for performing functions in accordance with exemplary embodiments.

FIG. 7 illustrates one possible example. FIG. 7 is a logic flow diagram for MU-MIMO precoder design and use, using a time-domain technique, for a wideband mMIMO system with constrained RF chains in a multi-path environment. This figure illustrates the operation of an exemplary method or methods, a result of execution of computer program instructions embodied on a computer readable memory, functions performed by logic implemented in hardware, and/or interconnected means for performing functions in accordance with exemplary embodiments. It is assumed that the blocks in FIG. 7 are performed by the eNB 170, e.g., under control of the MIMO module 150 at least in part.

The eNB 170 in block 703 selects a next time sample as a current time sample. Initially, the first time sample would be selected. As stated previously, the design of a current sample depends on all the previous samples of length equal to the length of channel impulse response minus one. The eNB 170 in block 705 obtains a subset of all the antennas activated during the previous samples of length equal to the length of the channel impulse response. The eNB 170 generates in block 715 multipath reflections corresponding to the current time instant from known channel impulse responses per antenna element in the subset of activated antennas. This block may be performed at some point prior to when the reflections are needed. The previously generated multipath reflections are retrieved by the eNB 170 in block 720.

In block 725, the eNB 170 generates the current time sample based on the knowledge of all the channel taps per antenna element. One technique for doing this is illustrated by block 730, where multipath signals at the current time sample are subtracted from the desired sample to be constructed at this sample instant and only the delta signal is generated. Based on the delta signal, the antenna elements are activated such that the sum of the signals resulting from the activated antennas results in the delta signal. The eNB 170 stores the value of the current time sample in block 732.

An algorithm like the Knapsack algorithm can be utilized to do the antenna selection. In block 733, use is made of the Knapsack algorithm to identify the antenna elements to be activated and the quantized signal to be transmitted from the activated antenna elements so that the current time sample can be constructed. It is noted that the Knapsack algorithm is merely one example of an algorithm that might be used to perform antenna selection.

In block 735, the eNB 170 activates the identified antennas and transmits the corresponding quantized signals using the identified antennas. In block 740, it is determined if all time samples have been selected. If not (block 740=No), the flow proceeds to block 703. If all time samples have been selected (block 740=Yes), the flow ends in block 745.

3) Hybrid Example

Figure 8B:
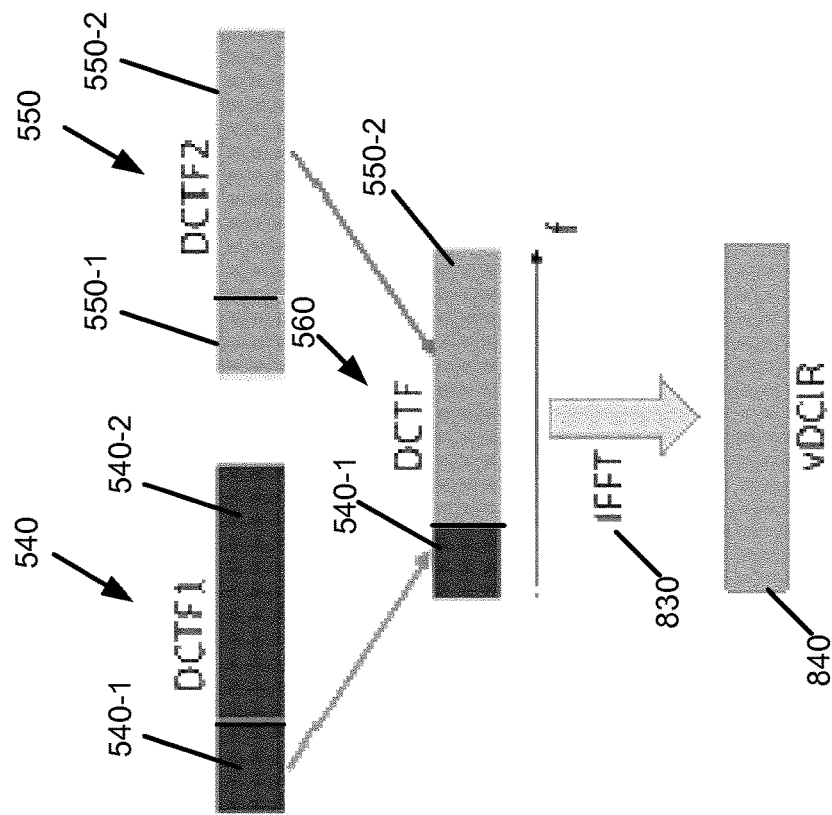
FIG. 8B is an illustration of formation of one DCTF from the DCTF of different UEs.
Figure 8A:
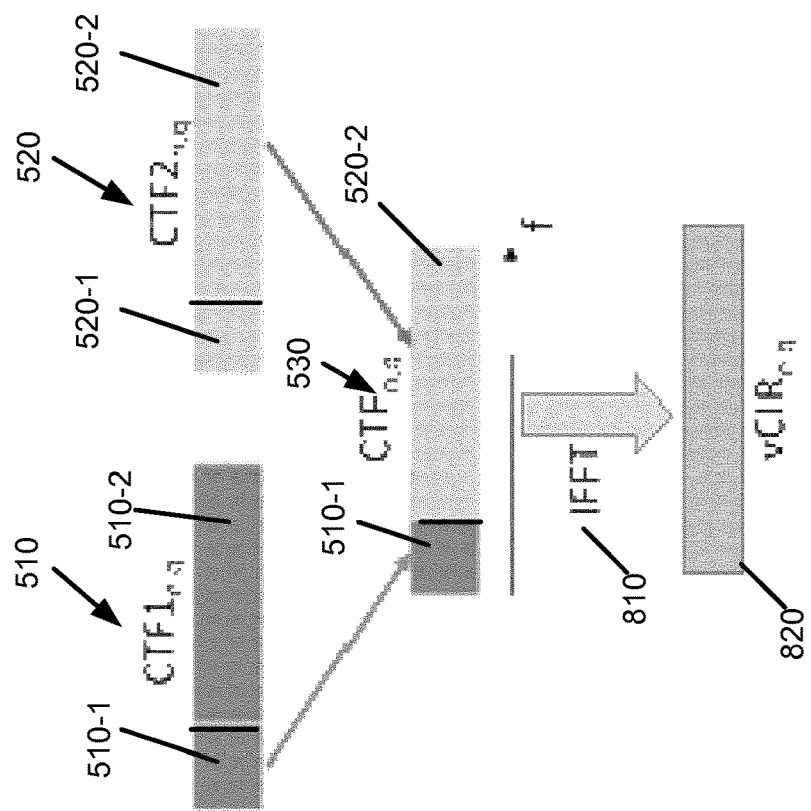
FIG. 8A is an illustration of combining CTF of different UEs in single CTF.

In a hybrid example, the CTFs and the DCTF are constructed using the frequency domain approach as shown in FIG. 5A and FIG. 5B, respectively. Then a virtual channel impulse response (vCIR) and virtual desired channel impulse response (vDCIR) are obtained as shown in FIG. 8A and FIG. 8B, respectively. In FIG. 8A, the CTF 530 is passed through an IFFT 810 to create the vCIR 820. Note that the CTFs are indicated as being $CTF1_{n,q}$ and $CTF2_{n,q}$, where the n indicates the antenna index (out of N total antennas) and q indicates sample index (out of total Q samples). The same indication is used for the vCIR 820 ($vCIR_{n,q}$). In FIG. 8B, the DCTF 560 is passed through an IFFT 830 to create the vDCIR 840. Now the vCIR 820 already takes into account the FDMA among multiple users. Then the time domain technique described above is used to construct the vDCIR 840 on a sample-after-sample basis. Note that the number of non-zero taps in the vDCIR 840 will be larger than that in the CIR of a single AE of a single user. Hence, during the time domain scheme, it will be necessary to take a larger number of virtual multipath components into account. The hybrid technique has the advantage of both the frequency domain solution and the time domain techniques, i.e., the FDMA is inherently modelled into the problem formulation and the antennas can be selected by choosing the over-the-air signal for a single sample at a time.

Figure 9:
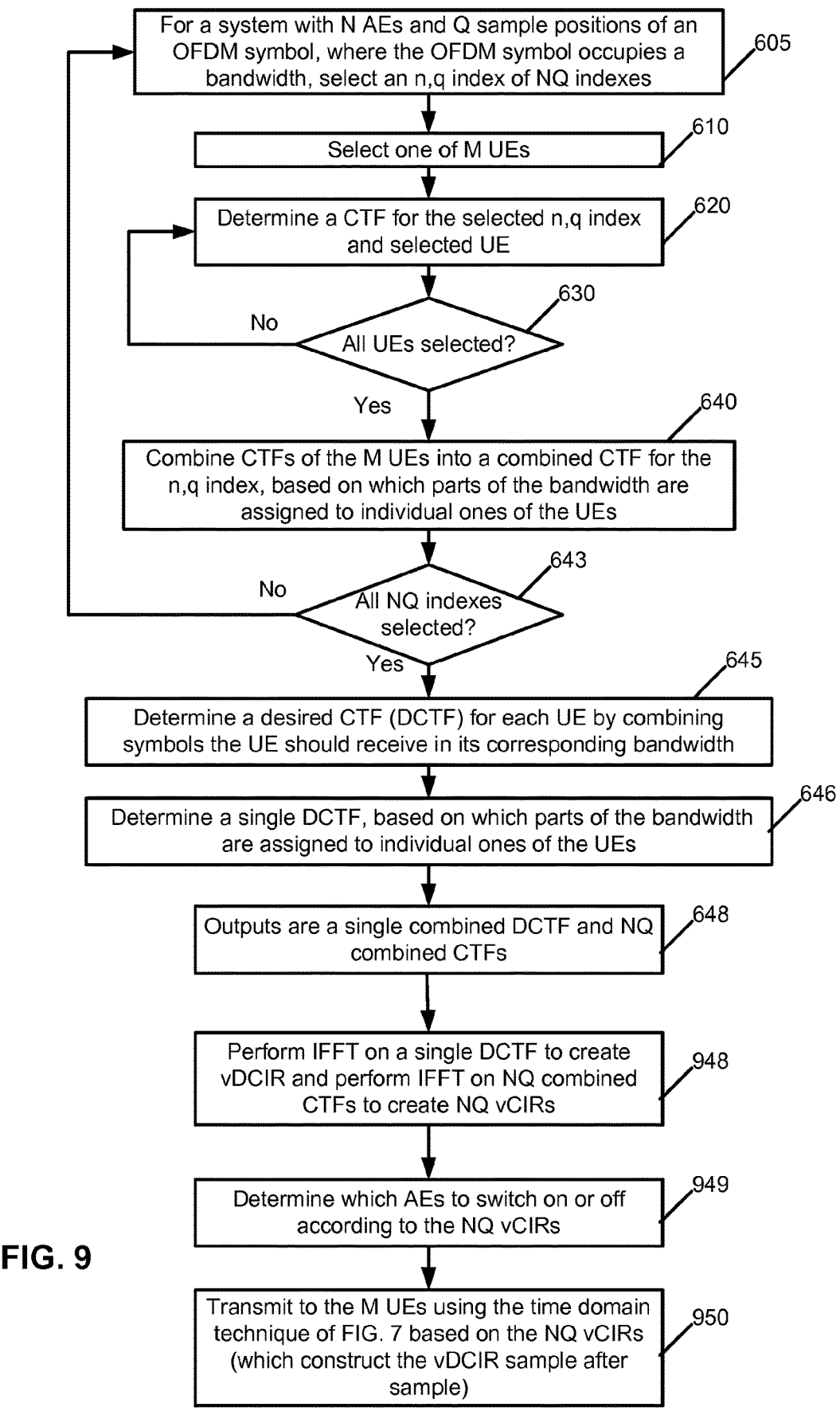
FIG. 9 is a logic flow diagram for MU-MIMO precoder design and use, using a hybrid technique that combines both frequency-domain and time-domain techniques, for a wideband mMIMO system with constrained RF chains in a multi-path environment, and illustrates the operation of an exemplary method or methods, a result of execution of computer program instructions embodied on a computer readable memory, functions performed by logic implemented in hardware, and/or interconnected means for performing functions in accordance with exemplary embodiments.

FIG. 9 describes this hybrid example. FIG. 9 is based on FIG. 6 and only the differences between FIGS. 6 and 9 are discussed here. In block 948, the eNB 170 performs an IFFT on the single DCTF to create a single vDCIR and performs an IFFT on the NQ combined CTFs to create NQ vCIRs. The eNB 170 in block 949 determines which AEs to switch on or off according to the NQ vCIRs. The eNB 170, in block 950, transmits to the M UEs 110 using the time domain technique of FIG. 7 based on the NQ vCIRs (which construct the vDCIR sample after sample).

4) Additional Examples

As described above, to construct the DCTF at the receivers, the appropriate combination of the CTFs needs to be identified. The simplest approach is to exhaustively consider all the combinations. For a system with 20 MHz bandwidth and 64 antennas, this means N*Q=64*2048 CTFs. Exhaustive search is computationally expensive and may be impossible in this case. Therefore, some heuristic algorithm with fast convergence might be used.

One option is to use a Knapsack algorithm. Here, the CTFs are chosen one after another. First, the CTF that minimizes the second norm distance to the DCTF is selected. Then, the consecutives CTFs are chosen such that the residual error is further reduced during each selection step. The Knapsack algorithm could still be computationally expensive since during the initial iterations distance to large number of CTFs need to compared with the DCTF. The Knapsack algorithm is guaranteed to converge because the distance metric is reduced at each iteration. However, convergence to global minimum is not guaranteed.

Another option can be determined as follows. From FIGS. 2A, 2B, 3A, and 3B, it is known that the CTF of any AE at different sample instances vary only in phase. Utilizing this fact, one can list the QN CTFs into Q amplitude functions and N phase functions. The computational complexity can be reduced by calculating the distance metric in two steps: 1) Distance of Q amplitude functions to the amplitude of DCTF; and 2) Distance of N phase functions to the phase of DCTF. Like the Knapsack algorithm, also in the current algorithm, the convergence is guaranteed but not necessarily to the global minimum.

The proposed mechanism may be extended to the case of DACs with multi-bit resolutions. In this case, the CTFs can be scaled with different values depending on the resolution of the DACs.

For time domain solution, e.g., of FIG. 7, either a single sample or multiple samples in the time domain are considered simultaneously, depending on the subband allocated to that receiver. The Knapsack algorithm may be utilized to determine the AEs and the time instances at which the AEs need to be activated.

For the hybrid solution, e.g., of FIG. 9, it is sufficient to consider only a single sample plus the delta due to the multi-path signal from the previously activated AEs. The Knapsack algorithm may be utilized to determine the AE combinations and the instances of activation.

Frequency-domain scheduling requires another extension to the conventional Knapsack algorithm. Similar as to the frequency-domain technique described above, one exploits the fact that signals out of the desired frequency band can have any shape and therefore relax the overall optimization problem.

Assume we have a frequency subband of the size of one single subcarrier. In that case, the time domain signal has to generate a single sine wave with the proper RF frequency. After the FFT, all other subcarrier signals will be suppressed so that any combination of other signal components different to the intended subcarrier frequency is allowed. For the time domain signal generation, this means that optimization per time sample—being fine for the wideband signals—is no longer the optimum, but one should optimize for the full time domain sequence of, e.g., 2048 time samples. The corresponding Knapsack algorithm will therefore optimize for 2048 time samples simultaneously with accordingly increasing overhead.

Luckily, frequency domain scheduling is typically performed per PRB or per PRB group, which can be beneficially exploited by optimizing the time-domain signal for the full subband. In case of, for example, scheduling 25 PRBs out of 100 PRBs, the filter bandwidth will be one-fourth of the full bandwidth. This reduces the relevant sequence length for optimization in the time domain to just four sub-sequent time samples so that the overall Knapsack complexity can be kept reasonably low. The number of samples that need to be simultaneously optimized is inversely proportional to the size of the subband scheduled to the receiver.

Note, the freedom due to the limited scheduling bandwidth means in the time domain that any combination of four subsequent time domain samples may be used to generate intended signal point as an average of the samples. More specifically, as we have a filter in frequency domain, e.g., four time-domain samples will result in one effective time sample with a sampling time of one divided by four. Therefore, the four time-domain samples can have different values as long as the filtered single time-domain sample generates the desired average value. Or, put another way, the 2048 samples are replaced by sets of 256 combined effective sub-samples.

Figure 10:
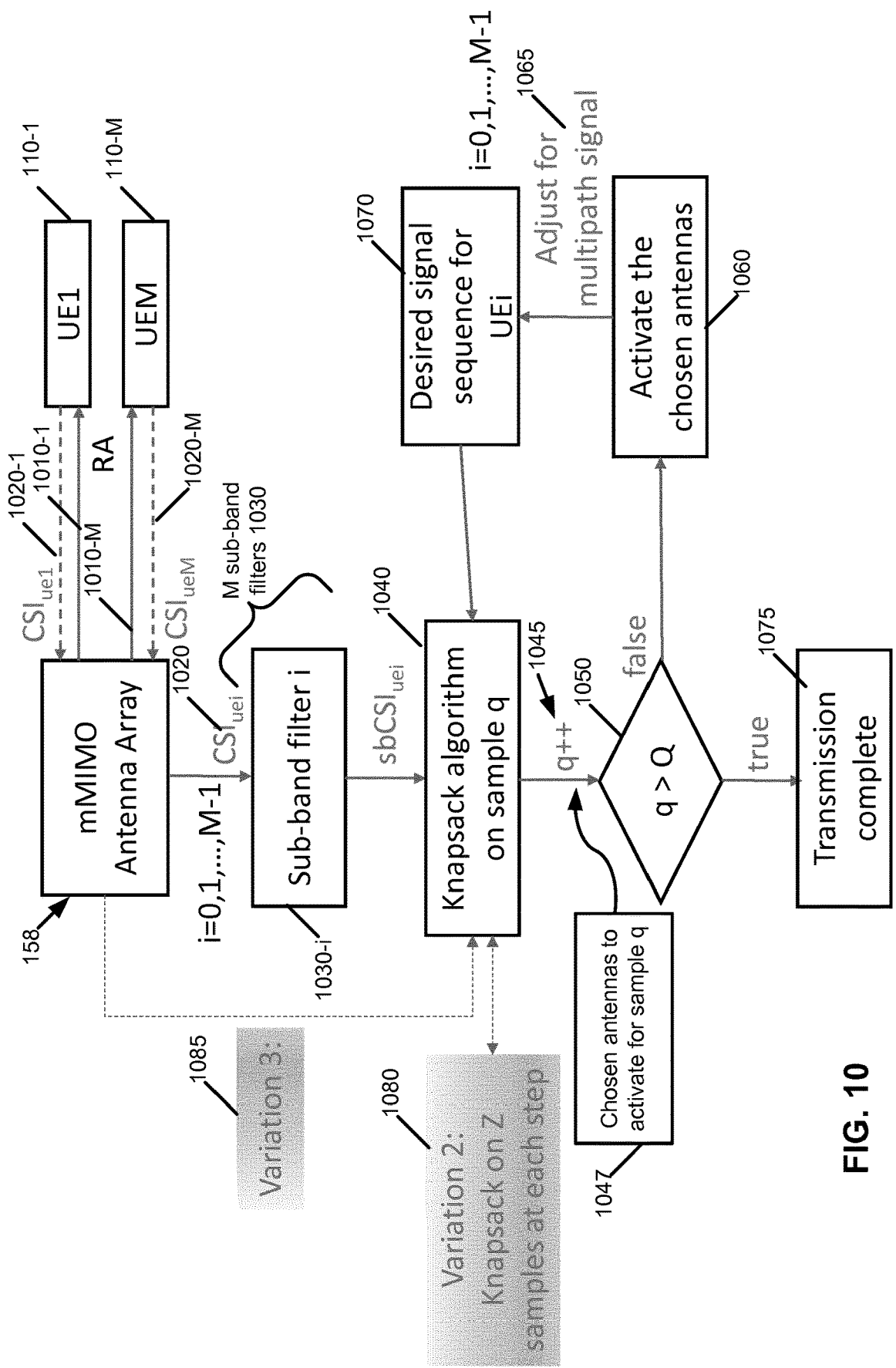
FIG. 10 is a logic flow diagram for MU-MIMO precoder design and use, suitable for both frequency-domain and time-domain techniques, for a wideband mMIMO system with constrained RF chains in a multi-path environment, and illustrates the operation of an exemplary method or methods, a result of execution of computer program instructions embodied on a computer readable memory, functions performed by logic implemented in hardware, and/or interconnected means for performing functions in accordance with exemplary embodiments.

Referring to FIG. 10, this figure is a logic flow diagram for MU-MIMO precoder design and use, suitable for both frequency-domain and time-domain techniques, for a wideband mMIMO system with constrained RF chains in a multi-path environment. This figure illustrates the operation of an exemplary method or methods, a result of execution of computer program instructions embodied on a computer readable memory, functions performed by logic implemented in hardware, and/or interconnected means for performing functions in accordance with exemplary embodiments. Most of the blocks in this figure are assumed to be performed by eNB 170, under control of the MIMO module 150 at least in part.

Note that FIG. 10 is a general picture that shows the steps involved in the schemes proposed above. This generality is described in more detail below after an overview of FIG. 10 is presented.

There are M UEs 110-1 through 110-M represented on the upper right-hand side of the figure. The mMIMO antenna array 158 is used by the eNB 170 to send resource allocations (RAs) 1010-1 through 1010-M to the M UEs 110. The UEs 110 return channel state information, $CSI_{ue1}$ 1020-1 through $CSI_{ueM}$ 1020-M (or other channel information), to the mMIMO antenna array 158. That CSI 1020 gets communicated to a corresponding sub-band filter i 1030-i. There are M sub-band filters 1030. Each sub-band filter 1030-i creates output of $sbCSI_{uei}$. The $sbCSI_{uei}$ corresponds to the CTF of the specific subband allocated to that $UE_i$. A Knapsack algorithm is performed on sample q in block 1040, where 0≤q≤(Q−1). The Knapsack algorithm outputs (block 1047) chosen AEs of the antenna array that should be activated (e.g., "on") for sample q. Note this also means that the AEs that are not activated are "off". In block 1045, q is incremented (q++). Block 1050 determines if the sample q is greater than the maximum number of samples (Q). If not (block 1050=false), in block 1060, the chosen antennas are activated using the current sample q. In block 1065, an adjustment is made by the eNB 170 for the multipath signal, and this adjustment results in the desired sequence for UEi (block 1070). The adjustment is the desired sample value—multipath signal (that is, the multipath signal subtracted from the desired sample value), thereby resulting in the delta signal which will be used for Knapsack algorithm. Note that the variable i in block 1070 is for i=0,1, . . . ,M−1. The flow proceeds to block 1040, where the next sample q is operated on. If q is greater than Q (block 1050=true), then in block 1075 the transmission is complete. The flow ends.

An example is helpful to clarify certain operations in FIG. 10. Assume that q=10 in block 1040, and the Knapsack algorithm is performed on sample q=10. Block 1060 is performed for q=10. Blocks 1065 and 1070 are performed for samples q=11, 12, . . . , up to 11+LengthofCIR−1, where LengthofCIR is the length of the CIR.

Also, in terms of the data that is actually transmitted for UE using the activated antennas, in the case of single bit DAC, the antennas can be switched on or switched off. In this case, the selected antennas are just switched on, and by over-the-air signal generation, the desired signal sequence for UE in block 1070 is received at the receiver. Note that the Knapsack algorithm tries to select the antennas to be activated such that the algorithm creates the desired signal sequence for UE in block 1070 that is then received at the receiver. The algorithm, however, may end up selecting antennas that result in a signal only closer to, but not exactly, the desired signal.

In case of a multi-bit DAC, say three phase bits and two amplitude bits, the selected AEs will transmit their corresponding quantized signal determined by the Knapsack algorithm in block 1040 to construct the desired signal in block 1070.

Three variations are described using FIG. 10. Variation 1 of FIG. 10 is the hybrid solution (see, e.g., FIG. 9) as previously described. Here, the subband filtering is meant to be performed to form the CTF and hence vCIR and the Knapsack algorithm is performed on time domain samples. It is noted that the sub-band filtering can be performed in the time domain, so an IFFT is not necessary in that situation. However, in practice to be computationally efficient, subband filtering may be performed in the frequency domain and an IFFT would then be performed to obtain the vCIR.

In addition to this variation, there are two additional variations illustrated by FIG. 10. In Variation 2 (see block 1080), the Knapsack algorithm is performed on Z (1<Z<M) samples at each step (e.g., iteration) of block 1040. A combination of Variation 1 and Variation 2 (with Z=Q) includes the subband filters and considers Q samples simultaneously. CSI is supposed to be CTFs and subband filtering is performed in the frequency domain. Here, for the Knapsack algorithm, basically all the sample Q samples are considered simultaneously. Also in this case sbCSI$_{uei}$, will have NQ combined CTFs. This yields the frequency domain solution (see, e.g., FIG. 6).

In another variation (Variation 3) in block 1085, the subband filters 1030 are skipped and the CSI 1020 goes to block 1040. This is the time domain solution for the multipath channel problem (no FDMA).

In another example, a combination of Variation 2 and Variation 3 yields a time domain solution with Z samples at a time, i.e., solves the FDMA issue. That is, for multipath with FDMA, Z<=Q depending on the bandwidth allocated to the UEs.

Additional examples are as follows.

Example 1

A method, comprising:

for a system with multiple antenna elements to be used to transmit multiple symbols to multiple user equipment and with multiple time sample positions, where the symbols occupy a time-frequency resource space and wherein at least some of the antenna elements are powered by constrained radio frequency (RF) chains having functionalities that are simplified relative to full RF chains, generating precoder coefficients for the multiple antenna elements taking into consideration multipath components of a signal to be transmitted from the multiple antenna elements to the multiple user equipment, wherein the generating forms precoder coefficients for individual ones of the constrained RF chains at corresponding certain time sample positions of the symbols; and transmitting the signal from the multiple antenna elements to the multiple user equipment using frequency division multiple access at least by applying the generated precoder coefficients to the multiple antenna elements over the multiple time sample positions and time-frequency resource space of the symbols.

Example 2

The method of example 1, wherein:

generating precoder coefficients for the multiple antenna elements taking into consideration multipath components of a signal to be transmitted from the multiple antenna elements to the multiple user equipment comprises:

determining channel transfer functions (CTFs) for each of the multiple user equipment for a selected time sample position of the symbol, wherein each CTF represents that an antenna element is switched on at this selected time sample position; and combining the determined CTFs into a combined CTF for the selected time sample position;

performing the determining the CTFs and the combining the determined CTFs into a combined CTF, for all of the time sample positions of the symbol;

determining a desired CTF (DCTF) for each of the multiple user equipment based on symbols each user equipment should receive in its corresponding bandwidth in the time-frequency resource space;

determining a combined DCTF based on which parts of total bandwidth of the time-frequency resource space are assigned to individual ones of the multiple user equipment;

determining which antenna elements to switch on or off according to the combined CTFs; and transmitting the signal comprises switching antenna elements for at least the antenna elements powered by the constrained RF chains based on the combined CTFs.

Example 3

The method of example 2, wherein determining which antenna elements to switch on or off according to the combined CTFs further comprises determining which selected antenna elements to switch on or off according to the combined CTFs such that a sum of the combined CTFs of the selected antenna elements results in a signal closer or equal to the DCTF, wherein closeness to the DCTF is determined based on one more criteria.

Example 4

The method of example 3, wherein:

the method further comprises performing a Knapsack algorithm on individual ones of the time sample positions for all the time sample positions and all the user equipment to perform at least the determining which selected antenna elements to switch on or off according to the combined CTFs such that a sum of the combined CTFs of the selected antenna elements results in a signal closer or equal to the DCTF, wherein output of the Knapsack algorithm comprises chosen antenna elements that are to be activated for a time sample position; and transmitting comprises switching antenna elements for at least the antenna elements powered by the constrained RF chains based on the output of the Knapsack algorithm.

Example 5

The method of example 4, wherein the determining CTFs for each of the multiple user equipment for the selected time sample position of the symbol is performed by each of multiple subband filters, each subband filter corresponding to one of the user equipment, and there is one subband filter per user equipment.

Example 6

The method of example 1, wherein:
generating precoder coefficients for the multiple antenna elements taking into consideration multipath components of a signal to be transmitted from the multiple antenna elements to the multiple user equipment comprises:
obtaining a subset of all the antennas activated during previous time samples of length equal to a length of a channel impulse response;
generating, using generated multipath reflections for the given subset of activated antennas, a current time sample for a selected one of the multiple time sample positions of the symbol based on knowledge of all channel taps per antenna element in the subset;
performing the obtaining a subset and generating a current time sample for all of the multiple time sample positions of the symbol;
identifying antenna elements to be activated and a quantized signal to be transmitted from the activated antenna elements so that the current time sample can be constructed; and
transmitting the signal comprises switching antenna elements for at least the antenna elements powered by the constrained RF chains based on the identified antenna elements and transmitting corresponding quantized signals on the identified antenna elements.

Example 7

The method of example 6, wherein:
generating a current time sample further comprises subtracting multipath signals at the current time sample and generating only a delta signal from the subtracting; and
identifying antenna elements to be activated and a quantized signal to be transmitted further comprises selecting which antenna elements to activate, based on the delta signal, such that a sum of signals resulting from the activated antenna elements results in the delta signal.

Example 8

The method of example 7, further comprising performing an algorithm on individual ones of the time sample positions for all the time sample positions and all the user equipment to perform the selecting which antenna elements to activate, based on the delta signal, such that the sum of signals resulting from the activated antenna elements results in the delta signal.

Example 9

The method of example 7, further comprising performing a Knapsack algorithm on multiple ones of the time sample positions for all the time sample positions and all the user equipment to perform the selecting which antenna elements to activate, based on the delta signal, such that the sum of signals resulting from the activated antenna elements results in the delta signal, wherein a number of the multiple ones of the time sample positions is less than or equal to all of the time positions.

Example 10

The method of example 1, wherein:
generating precoder coefficients for the multiple antenna elements taking into consideration multipath components of a signal to be transmitted from the multiple antenna elements to the multiple user equipment comprises:
determining channel transfer functions (CTFs) for each of the multiple user equipment for a selected time sample position of the symbol, wherein each CTF represents that an antenna element is switched on at this selected time sample position; and
combining the determined CTFs into a combined CTF for the selected time sample position;
performing the determining the CTFs and the combining the determined CTFs into a combined CTF;
determining a desired CTF (DCTF) for each of the multiple user equipment based on symbols each user equipment should receive in its corresponding bandwidth in the time-frequency resource space;
determining a combined DCTF based on which parts of total bandwidth of the time-frequency resource space are assigned to individual ones of the multiple user equipment;
converting the DCTF from a frequency domain to a time domain to create a virtual desired channel impulse response (vDCIR);
converting the combined CTFs from the frequency domain to the time domain to create corresponding virtual channel impulse responses (vCIRs);
determining which antenna elements to switch on or off according to the vCIRs; and
transmitting the signal comprises switching antenna elements for at least the antenna elements powered by the constrained RF chains based on time domain transmission using the vCIRs.

Example 11

The method of example 10, wherein:
the method further comprises performing a Knapsack algorithm on individual ones of the time sample positions for all the time sample positions and all the user equipment to perform determining using the VCIRs which antenna elements to switch on or off to reproduce the vDCIR at the user equipment, wherein output of the Knapsack algorithm comprises chosen antenna elements that are to be activated for a time sample position; and
transmitting comprises switching antenna elements for at least the antenna elements powered by the constrained RF chains based on the output of the Knapsack algorithm.

Example 12

The method of example 11, wherein the determining CTFs for each of the multiple user equipment for the selected time sample position of the symbol is performed by each of multiple subband filters, each subband filter corresponding to one of the user equipment, and there is one subband filter per user equipment.

Example 13

An apparatus, comprising:

means, for a system with multiple antenna elements to be used to transmit multiple symbols to multiple user equipment and with multiple time sample positions, where the symbols occupy a time-frequency resource space and wherein at least some of the antenna elements are powered by constrained radio frequency (RF) chains having functionalities that are simplified relative to full RF chains, for generating precoder coefficients for the multiple antenna elements taking into consideration multipath components of a signal to be transmitted from the multiple antenna elements to the multiple user equipment, wherein the means for generating forms precoder coefficients for individual ones of the constrained RF chains at corresponding certain time sample positions of the symbols; and means for transmitting the signal from the multiple antenna elements to the multiple user equipment using frequency division multiple access at least by applying the generated precoder coefficients to the multiple antenna elements over the multiple time sample positions and time-frequency resource space of the symbols.

Example 14

The apparatus of example 13, wherein:

the means for generating precoder coefficients for the multiple antenna elements taking into consideration multipath components of a signal to be transmitted from the multiple antenna elements to the multiple user equipment comprises:

means for determining channel transfer functions (CTFs) for each of the multiple user equipment for a selected time sample position of the symbol, wherein each CTF represents that an antenna element is switched on at this selected time sample position; and means for combining the determined CTFs into a combined CTF for the selected time sample position;

means for performing the determining the CTFs and the combining the determined CTFs into a combined CTF, for all of the time sample positions of the symbol;

means for determining a desired CTF (DCTF) for each of the multiple user equipment based on symbols each user equipment should receive in its corresponding bandwidth in the time-frequency resource space;

means for determining a combined DCTF based on which parts of total bandwidth of the time-frequency resource space are assigned to individual ones of the multiple user equipment;

determining which antenna elements to switch on or off according to the combined CTFs; and the means for transmitting the signal comprises means for switching antenna elements for at least the antenna elements powered by the constrained RF chains based on the combined CTFs.

Example 15

The apparatus of example 14, wherein the means for determining which antenna elements to switch on or off according to the combined CTFs further comprises means for determining which selected antenna elements to switch on or off according to the combined CTFs such that a sum of the combined CTFs of the selected antenna elements results in a signal closer or equal to the DCTF, wherein closeness to the DCTF is determined based on one more criteria.

Example 16

The apparatus of example 15, wherein:

the apparatus further comprises means for performing a Knapsack algorithm on individual ones of the time sample positions for all the time sample positions and all the user equipment to perform at least the means for determining which selected antenna elements to switch on or off according to the combined CTFs such that a sum of the combined CTFs of the selected antenna elements results in a signal closer or equal to the DCTF, wherein output of the Knapsack algorithm comprises chosen antenna elements that are to be activated for a time sample position; and the means for transmitting comprises means for switching antenna elements for at least the antenna elements powered by the constrained RF chains based on the output of the Knapsack algorithm.

Example 17

The apparatus of example 16, wherein the means for determining CTFs for each of the multiple user equipment for the selected time sample position of the symbol is performed by each of multiple subband filters, each subband filter corresponding to one of the user equipment, and there is one subband filter per user equipment.

Example 18

The apparatus of example 13, wherein:

the means for generating precoder coefficients for the multiple antenna elements taking into consideration multipath components of a signal to be transmitted from the multiple antenna elements to the multiple user equipment comprises:

means for obtaining a subset of all the antennas activated during previous time samples of length equal to a length of a channel impulse response;

means for generating, using generated multipath reflections for the given subset of activated antennas, a current time sample for a selected one of the multiple time sample positions of the symbol based on knowledge of all channel taps per antenna element in the subset;

means for performing the obtaining a subset and generating a current time sample for all of the multiple time sample positions of the symbol;

means for identifying antenna elements to be activated and a quantized signal to be transmitted from the activated antenna elements so that the current time sample can be constructed; and the means for transmitting the signal comprises means for switching antenna elements for at least the antenna elements powered by the constrained RF chains based on the identified antenna elements and transmitting corresponding quantized signals on the identified antenna elements.

Example 19

The apparatus of example 18, wherein:

the means for generating a current time sample further comprises means for subtracting multipath signals at the current time sample and generating only a delta signal from the subtracting; and the means for identifying antenna elements to be activated and a quantized signal to be transmitted further comprises means for selecting which antenna elements to activate, based on the delta signal, such that a sum of signals resulting from the activated antenna elements results in the delta signal.

Example 20

The apparatus of example 19, further comprising means for performing an algorithm on individual ones of the time sample positions for all the time sample positions and all the user equipment to perform the means for selecting which antenna elements to activate, based on the delta signal, such that the sum of signals resulting from the activated antenna elements results in the delta signal.

Example 21

The apparatus of example 19, further comprising means for performing a Knapsack algorithm on multiple ones of the time sample positions for all the time sample positions and all the user equipment to perform the means for selecting which antenna elements to activate, based on the delta signal, such that the sum of signals resulting from the activated antenna elements results in the delta signal, wherein a number of the multiple ones of the time sample positions is less than or equal to all of the time positions.

Example 22

The apparatus of example 13, wherein:
the means for generating precoder coefficients for the multiple antenna elements taking into consideration multipath components of a signal to be transmitted from the multiple antenna elements to the multiple user equipment comprises:
means for determining channel transfer functions (CTFs) for each of the multiple user equipment for a selected time sample position of the symbol, wherein each CTF represents that an antenna element is switched on at this selected time sample position; and
means for combining the determined CTFs into a combined CTF for the selected time sample position;
means for performing the determining the CTFs and the combining the determined CTFs into a combined CTF;
means for determining a desired CTF (DCTF) for each of the multiple user equipment based on symbols each user equipment should receive in its corresponding bandwidth in the time-frequency resource space;
means for determining a combined DCTF based on which parts of total bandwidth of the time-frequency resource space are assigned to individual ones of the multiple user equipment;
means for converting the DCTF from a frequency domain to a time domain to create a virtual desired channel impulse response (vDCIR);
means for converting the combined CTFs from the frequency domain to the time domain to create corresponding virtual channel impulse responses (vCIRs);
means for determining which antenna elements to switch on or off according to the vCIRs; and
the means for transmitting the signal comprises means for switching antenna elements for at least the antenna elements powered by the constrained RF chains based on time domain transmission using the vCIRs.

Example 23

The apparatus of example 22, wherein:
the apparatus further comprises means for performing a Knapsack algorithm on individual ones of the time sample positions for all the time sample positions and all the user equipment to perform the means for determining using the vCIRs which antenna elements to switch on or off to reproduce the vDCIR at the user equipment, wherein output of the Knapsack algorithm comprises chosen antenna elements that are to be activated for a time sample position; and
the means for transmitting comprises means for switching antenna elements for at least the antenna elements powered by the constrained RF chains based on the output of the Knapsack algorithm.

Example 24

The apparatus of example 23, wherein the means for determining CTFs for each of the multiple user equipment for the selected time sample position of the symbol is performed by each of multiple subband filters, each subband filter corresponding to one of the user equipment, and there is one subband filter per user equipment.

Example 25

A base station comprising the apparatus of any one of examples 13 to 24.

Example 26

A communication system comprising the apparatus of any one of examples 13 to 24 and multiple user equipment.

Example 27

A computer program comprising program code for executing the method according to any of examples 1 to 12.

Example 28

The computer program according to example 27, wherein the computer program is a computer program product comprising a computer-readable medium bearing computer program code embodied therein for use with a computer.

Example 29

An apparatus comprising one or more processors and one or more memories including computer program code. The one or more memories and the computer program code are configured to, with the one or more processors, cause the apparatus to perform at least the following: for a system with multiple antenna elements to be used to transmit multiple symbols to multiple user equipment and with multiple time sample positions, where the symbols occupy a time-frequency resource space and wherein at least some of the antenna elements are powered by constrained radio frequency (RF) chains having functionalities that are simplified relative to full RF chains, generating precoder coefficients for the multiple antenna elements taking into consideration multipath components of a signal to be transmitted from the multiple antenna elements to the multiple user equipment, wherein the generating forms precoder coefficients for individual ones of the constrained RF chains at corresponding certain time sample positions of the symbols; and transmitting the signal from the multiple antenna elements to the multiple user equipment using frequency division multiple access at least by applying the generated precoder coefficients to the multiple antenna elements over the multiple time sample positions and time-frequency resource space of the symbols.

Example 30

The example of claim 29 wherein the one or more memories and the computer program code are configured to, with the one or more processors, cause the apparatus to perform any of the methods of claims 2 to 12.

Without in any way limiting the scope, interpretation, or application of the claims appearing below, technical effects and advantages of one or more of the example embodiments disclosed herein are as follows.

1. A proposed over-the-air signal generation mechanism takes into account that the channel is multi-path channel and hence, there is no inter-symbol interference. Furthermore, the orthogonality of the subcarriers is maintained.

2. By considering that each UE is interested in its own band, the CTFs and DCTFs of different UEs (scheduled on different bands) are combined into single set of Q*N CTFs and one DCTF. Thereby, the computational complexity is kept the same as a single UE utilizing the entire bandwidth.

3. Using a proposed over-the-air DCTF construction mechanism, it is possible to remove the need for a cyclic prefix. Let ICTF denoted the influence of the AEs switched on during the previous OFDM symbol on the current OFDM symbol. Since the DCTF is constructed by choosing the appropriate combination of the CTFs, one can subtract the ICTF from the DCTF before determining the determining the combinations of CTFs necessary to form the DCTF.

4. Furthermore, in an OFDM system, the DCTF corresponds to the symbols transmitted and hence, equalization is not necessary. However, it may happen that the AEs are not able to exactly construct the DCTF; in this case equalization would help reducing the construction error and pilot symbols should be inserted in regular intervals to help improve the symbol demodulation process.

5. Additionally, the time-domain solution for solving the multi-path solution is very straight forward and of similar complexity as for single-tap channels and mainly requires some additional memory, but depending on the implementation such a memory might be needed anyway.

6. The time domain solution for frequency dependent scheduling is especially beneficial in case of relatively larger PRB groups, as the complexity increase is relatively moderate compared to that of a wideband allocation per UE.

7. The hybrid solution has same complexity as the single tap complexity even for the case where the users get only small subband of the total bandwidth.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

4G fourth generation
5G fifth generation
ADC analog-to-digital converter
AE antenna element
CTF channel transfer function
DAC digital to audio converter
DCTF desired CTF
eNB (or eNodeB) evolved Node B (e.g., an LTE base station)
f frequency
FDMA frequency division multiple access
FFT fast Fourier transform
ICTF inverse CTF
I/F interface
IFFT inverse FFT
LTE long term evolution
MHz megaHertz
MIMO multiple input, multiple output
mMIMO massive MIMO
MME mobility management entity
MSE mean squared error
MU multiple user
NCE network control element
ns nanoseconds
N/W network
OFDM orthogonal frequency division multiplexing
PA power amplifier
PRB physical resource block
QAM quadrature amplitude modulation
RA resource allocation
rad radians
RF radio frequency
RRH remote radio head
Rx receiver
SGW serving gateway
Tx transmitter or transmission
UE user equipment (e.g., a wireless, typically mobile device)
vCIR virtual channel impulse response
vDCIR virtual desired channel impulse response
VLSI very large scale integrated circuit

What is claimed is:

1. A method, comprising:

for a system with multiple antenna elements to be used to transmit multiple symbols to multiple user equipment and with multiple time sample positions, where the symbols occupy a time-frequency resource space and wherein at least some of the antenna elements are powered by constrained radio frequency chains having functionalities that are simplified relative to full radio frequency chains, generating precoder coefficients for the multiple antenna elements taking into consideration multipath components of a signal to be transmitted from the multiple antenna elements to the multiple user equipment, wherein the generating forms precoder coefficients for individual ones of the constrained radio frequency chains at corresponding certain time sample positions of the symbols, wherein generating precoder coefficients for the multiple antenna elements taking into consideration multipath components of a signal to be transmitted from the multiple antenna elements to the multiple user equipment comprises:

determining channel transfer functions for each of the multiple user equipment for a selected time sample position of a symbol of the symbols, wherein each channel transfer function represents that an antenna element is switched on at this selected time sample position; and combining the determined channel transfer functions into a combined channel transfer function for the selected time sample position;

performing the determining the channel transfer functions and the combining the determined channel transfer functions into a combined channel transfer function, for all of the time sample positions of the symbol;

determining a desired channel transfer function for each of the multiple user equipment based on symbols each user equipment should receive in its corresponding bandwidth in the time-frequency resource space;

determining a combined desired channel transfer function based on which parts of total bandwidth of the time-frequency resource space are assigned to individual ones of the multiple user equipment;

determining which antenna elements to switch on or off according to the combined channel transfer functions; and transmitting the signal from the multiple antenna elements to the multiple user equipment using frequency division multiple access at least by applying the generated precoder coefficients to the multiple antenna elements over the multiple time sample positions and time-frequency resource space of the symbols, wherein transmitting the signal comprises switching antenna elements for at least the antenna elements powered by the constrained radio frequency chains based on the combined channel transfer functions.

2. The method of claim 1, wherein determining which antenna elements to switch on or off according to the combined channel transfer functions further comprises determining which selected antenna elements to switch on or off according to the combined channel transfer functions such that a sum of the combined channel transfer functions of the selected antenna elements results in a signal closer or equal to the desired channel transfer function, wherein closeness to the desired channel transfer function is determined based on one more criteria.

3. The method of claim 2, wherein:

the method further comprises performing a Knapsack algorithm on individual ones of the time sample positions for all the time sample positions and all the user equipment to perform at least the determining which selected antenna elements to switch on or off according to the combined channel transfer functions such that a sum of the combined channel transfer functions of the selected antenna elements results in a signal closer or equal to the desired channel transfer function, wherein output of the Knapsack algorithm comprises chosen antenna elements that are to be activated for a time sample position; and transmitting comprises switching antenna elements for at least the antenna elements powered by the constrained radio frequency chains based on the output of the Knapsack algorithm.

4. The method of claim 1, wherein:

transmitting the signal comprises switching antenna elements for at least the antenna elements powered by the constrained radio frequency chains and transmitting corresponding quantized signals on identified antenna elements.

5. The method of claim 1, further comprising performing an algorithm on individual ones of the time sample positions for all the time sample positions and all the user equipment to perform selecting which antenna elements to activate.

6. The method of claim 1, further comprising performing a Knapsack algorithm on multiple ones of the time sample positions for all the time sample positions and all the user equipment perform selecting which antenna elements to activate such that a sum of signals resulting from the activated antenna elements results in a delta signal, wherein a number of the multiple ones of the time sample positions is less than or equal to all of the time sample positions.

7. The method of claim 1, comprising:

converting the desired channel transfer function from a frequency domain to a time domain to create a virtual desired channel impulse response; and converting the combined channel transfer functions from the frequency domain to the time domain to create corresponding virtual channel impulse responses, wherein determining which antenna elements to switch on or off is according to the virtual channel impulse responses; and wherein transmitting the signal comprises switching antenna elements for at least the antenna elements powered by the constrained radio frequency chains based on time domain transmission using the virtual channel impulse responses.

8. The method of claim 7, wherein:

the method further comprises performing a Knapsack algorithm on individual ones of the time sample positions for all the time sample positions and all the user equipment to perform determining using the virtual channel impulse responses which antenna elements to switch on or off to reproduce the virtual desired channel impulse response at the user equipment, wherein output of the Knapsack algorithm comprises chosen antenna elements that are to be activated for a time sample position; and transmitting comprises switching antenna elements for at least the antenna elements powered by the constrained radio frequency chains based on the output of the Knapsack algorithm.

9. An apparatus, comprising:
circuitry, for a system with multiple antenna elements to be used to transmit multiple symbols to multiple user equipment and with multiple time sample positions, where the symbols occupy a time-frequency resource space and wherein at least some of the antenna elements are powered by constrained radio frequency chains having functionalities that are simplified relative to full radio frequency chains, configured to generate precoder coefficients for the multiple antenna elements taking into consideration multipath components of a signal to be transmitted from the multiple antenna elements to the multiple user equipment, wherein the generating circuitry forms precoder coefficients for individual ones of the constrained radio frequency chains at corresponding certain time sample positions of the symbols, wherein the generating circuitry comprises:
circuitry configured to determine channel transfer functions for each of the multiple user equipment for a selected time sample position of a symbol of the symbols, wherein each channel transfer function represents that an antenna element is switched on at this selected time sample position; and
circuitry configured to combine the determined channel transfer functions into a combined channel transfer function for the selected time sample position;
circuitry configured to perform the determining of the channel transfer functions and the combining the determined channel transfer functions into a combined channel transfer function, for all of the time sample positions of the symbol;
circuitry configured to determine a desired channel transfer function for each of the multiple user equipment based on the symbols each user equipment should receive in its corresponding bandwidth in the time-frequency resource space;
circuitry configured to determine a combined desired channel transfer function based on which parts of total bandwidth of the time-frequency resource space are assigned to individual ones of the multiple user equipment;
circuitry configured to determine which antenna elements to switch on or off according to the combined channel transfer functions; and
circuitry configured to transmit the signal from the multiple antenna elements to the multiple user equipment using frequency division multiple access at least by applying the generated precoder coefficients to the multiple antenna elements over the multiple time sample positions and time-frequency resource space of the symbols, wherein the transmitting comprises circuitry configured to switch antenna elements for at least the antenna elements powered by the constrained radio frequency chains based on the combined channel transfer functions.

10. The apparatus of claim 9, wherein the determining circuitry, which is configured to determine which antenna elements to switch on or off according to the combined channel transfer functions, further comprises circuitry configured to determine which selected antenna elements to switch on or off according to the combined channel transfer functions such that a sum of the combined channel transfer functions of the selected antenna elements results in a signal closer or equal to the desired channel transfer function, wherein closeness to the desired channel transfer function is determined based on one more criteria.

11. The apparatus of claim 10, wherein:
the apparatus further comprises circuitry configured to perform a Knapsack algorithm on individual ones of the time sample positions for all the time sample positions and all the user equipment to perform at least the determining of which of the selected antenna elements to switch on or off according to the combined channel transfer functions such that a sum of the combined channel transfer functions of the selected antenna elements results in a signal closer or equal to the desired channel transfer function, wherein output of the Knapsack algorithm comprises chosen antenna elements that are to be activated for a time sample position; and
the transmitting circuitry comprises circuitry configured to switch the antenna elements for at least the antenna elements powered by the constrained radio frequency chains based on the output of the Knapsack algorithm.

12. The apparatus of claim 9, wherein:
the transmitting circuitry, which is configured to transmit the signal, comprises circuitry configured to switch the antenna elements for at least the antenna elements powered by the constrained radio frequency chains and configured to transmit corresponding quantized signals on identified antenna elements.

13. The apparatus of claim 11, further comprising circuitry configured to perform an algorithm on individual ones of the time sample positions for all the time sample positions and all the user equipment to perform selecting of which antenna elements to activate such that a sum of signals resulting from the activated antenna elements results in a delta signal.

14. The apparatus of claim 11, further comprising circuitry configured to perform a Knapsack algorithm on multiple ones of the time sample positions for all the time sample positions and all the user equipment to perform selecting of which antenna elements to activate such that a sum of signals resulting from the activated antenna elements results in a delta signal, wherein a number of the multiple ones of the time sample positions is less than or equal to all of the time sample positions.

15. The apparatus of claim 9, comprising:
circuitry configured to convert the desired channel transfer function from a frequency domain to a time domain to create a virtual desired channel impulse response;
circuitry configured to convert the combined channel transfer functions from the frequency domain to the time domain to create corresponding virtual channel impulse responses;
circuitry configured to determine which antenna elements to switch on or off according to the virtual channel impulse responses; and
wherein the transmitting circuitry comprises circuitry configured to switch antenna elements for at least the antenna elements powered by the constrained radio frequency chains based on time domain transmission using the virtual channel impulse responses.

16. The apparatus of claim 15, wherein:
the apparatus further comprises circuitry configured to perform a Knapsack algorithm on individual ones of the time sample positions for all the time sample positions and all the user equipment to perform the determining using the virtual channel impulse responses which antenna elements to switch on or off to reproduce the virtual desired channel impulse response at the user equipment, wherein output of the Knapsack algorithm comprises chosen antenna elements that are to be activated for a time sample position; and the transmitting circuitry comprises circuitry configured to switch antenna elements for at least the antenna elements powered by the constrained radio frequency chains based on the output of the Knapsack algorithm.

17. A computer program product comprising a non-transitory computer-readable medium bearing computer program code executed by at least one processor to:

for a system with multiple antenna elements to be used to transmit multiple symbols to multiple user equipment and with multiple time sample positions, where the symbols occupy a time-frequency resource space and wherein at least some of the antenna elements are powered by constrained radio frequency chains having functionalities that are simplified relative to full radio frequency chains, generating precoder coefficients for the multiple antenna elements taking into consideration multipath components of a signal to be transmitted from the multiple antenna elements to the multiple user equipment, wherein the generating forms precoder coefficients for individual ones of the constrained radio frequency chains at corresponding certain time sample positions of the symbols, wherein generating precoder coefficients for the multiple antenna elements taking into consideration multipath components of a signal to be transmitted from the multiple antenna elements to the multiple user equipment comprises:

determining channel transfer functions for each of the multiple user equipment for a selected time sample position of a symbol of the symbols, wherein each channel transfer function represents that an antenna element is switched on at this selected time sample position; and combining the determined channel transfer functions into a combined channel transfer function for the selected time sample position;

performing the determining the channel transfer functions and the combining the determined channel transfer functions into a combined channel transfer function, for all of the time sample positions of the symbol; determining a desired channel transfer function for each of the multiple user equipment based on the symbols each user equipment should receive in its corresponding bandwidth in the time-frequency resource space;

determining a combined desired channel transfer function based on which parts of total bandwidth of the time-frequency resource space are assigned to individual ones of the multiple user equipment;

determining which antenna elements to switch on or off according to the combined channel transfer functions; and transmitting the signal comprises switching antenna elements for at least the antenna elements powered by the constrained radio frequency chains based on the combined channel transfer functions; and transmitting the signal from the multiple antenna elements to the multiple user equipment using frequency division multiple access at least by applying the generated precoder coefficients to the multiple antenna elements over the multiple time sample positions and time-frequency resource space of the symbols.

* * * * *